H. P. KRAFT.
INFLATING COUPLING.
APPLICATION FILED APR. 22, 1918.

1,364,441.

Patented Jan. 4, 1921.

WITNESS:
Rene Bruine

INVENTOR
Henry P. Kraft,
By Attorneys,
Fraser, Jenk & Myers

UNITED STATES PATENT OFFICE.

HENRY P. KRAFT, OF RIDGEWOOD, NEW JERSEY.

INFLATING-COUPLING.

1,364,441.   Specification of Letters Patent.   Patented Jan. 4, 1921.

Application filed April 22, 1918. Serial No. 229,900.

*To all whom it may concern:*

Be it known that I, HENRY P. KRAFT, a citizen of the United States of America, residing in Ridgewood, in the county of Bergen and State of New Jersey, have invented certain new and useful Improvements in Inflating-Couplings, of which the following is a specification.

This invention relates to couplings used chiefly for inflating pneumatic tires from a tank or reservoir of compressed air.

The invention constitutes an improvement upon the construction set forth in my application filed June 25, 1917, Serial No. 176,814.

The improvements relate principally to the construction of bell-shaped or cup or cone-shaped washer or gasket, and the coaction therewith of the valve opener. The objects are to increase the durability of the yielding washer by protecting it from abrasion by the screw-threaded nipple or shell of the tire valve, while affording a tight joint against the rim of such nipple to prevent leakage of air between the coupling and the tire valve.

The preferred embodiment is shown in the accompanying drawings, wherein—

Figure 2:
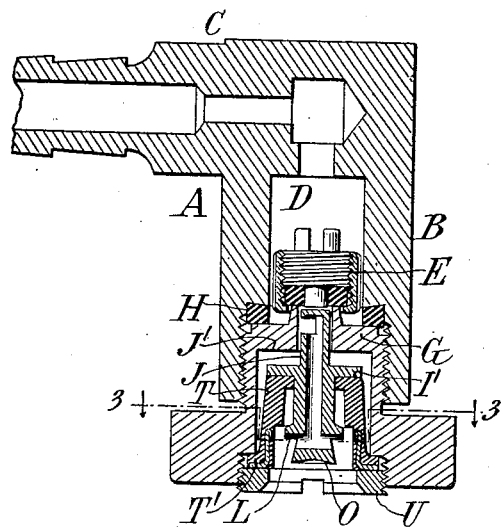
Fig. 2 is a similar section of the coupling, showing its valve closed when not in use.
Figure 1:
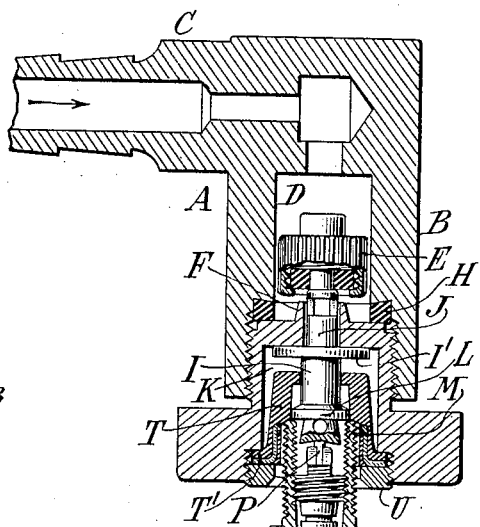
Figure 1 is a mid-section of the coupling and a portion of the tire valve, showing the coupling applied to the latter in the act of inflating.
Figure 3:
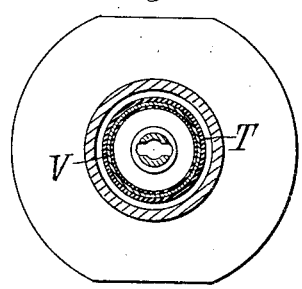
Fig. 3 is a transverse section in the plane of the line 3—3 in Fig. 2.

Referring to the drawings, A indicates the coupling as a whole, which is shown as comprising a cylindrical shell or casing B and an angled connection C, the latter formed with the usual nipple for receiving the end of the hose, the opposite end of which is connected with the compressed air tank. The cylindrical shell B is formed with a valve chamber D within which works a check valve E which coacts with a seat F formed on a seat member G which is united to the shell B preferably by being screwed thereinto, a tight joint between the two being formed by a packing H. The valve E is normally held against the seat by the pressure of air within the chamber D. To open the valve when the coupling is applied to a tire valve, a movable part I is provided which constitutes a valve opener. This part has a valve opening element J formed with a stem extending up through the valve seat so as to contact with an abutment on the valve and lift it, as shown in Fig. 1. The valve opener is formed with a shoulder L which is engaged by the shoulder or rim M of the tire valve N, so that by pressing down the coupling the valve opener is elevated and lifts the check valve. Below the shoulder L is an abutment O which enters the nipple of the tire valve and presses down the tire valve pin P so as to open the tire valve check Q, and hold the tire valve open during the admission of air against the pressure of its usual spring S. To make a tight joint between the coupling and tire valve, a cone-shaped or cup-shaped washer or gasket T is provided which is held in place by a flange T' which is clamped against the seat member by a screw-threaded collar U, which latter has an opening of sufficient size to easily admit the nipple of the tire valve and guide the latter centrally into the washer.

So far as described, the parts are substantially similar to those in my aforesaid application.

Figure 6:
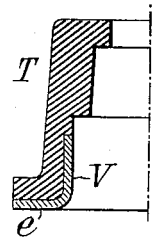
Fig. 6 is a half-section of a modified construction of washer.

According to the present invention, the washer T is made of a different shape so as to provide not only a neck portion $a$ to embrace the body of the opener I, but also an enlarged portion $b$ to fit around the shoulder or flange L of the opener, and a shoulder $c$ to receive the end or rim of the tire valve nipple. The portion $d$ beneath this shoulder, instead of closely embracing the screw-threaded exterior of the tire valve nipple, is made so large as to freely admit the latter without any abrasive contact with the external screw-threads thereof. This portion $d$ is prevented from contracting around and hugging the screw-threaded valve nipple by means of a stiffener V which is made of metal or other sufficiently rigid material, and is preferably embedded or molded within the rubber washer, and has an out-turned flange $e$ which extends beneath the flange T' and makes contact with the collar U, so that as the latter is screwed up, the rubber of the washer need not be twisted and distorted. While the stiffener V is preferably embedded in the rubber, as described, yet this is not essential as it may be applied interiorly thereof, as shown in Fig. 6. In such case it is preferably united permanently to the rubber in the process of vulcanizing the latter.

The valve opener I has, as before, a flange I' which, when it is pushed up, forms a stop against the shoulder J' which constitutes the upper side of the chamber within the seat member, and this limits the upward displacement of the opener, as shown in Fig. 1. The proportions are such that the opener has preferably a shorter movement than heretofore, and when lifted to its highest position its flange or shoulder L does not as heretofore move up against the shoulder b' in the washer, but instead enters a short distance into the chamber b thereof, where it lies within the flexible or unstiffened walls of the washer. The rim of the tire valve nipple presses up against the shoulder c of the washer and somewhat distorts this shoulder, as shown in Figs. 1 and 5.

Figure 7:
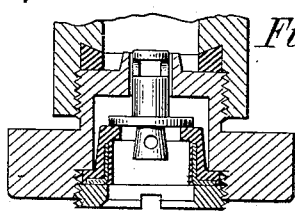
Fig. 7 is a sectional view of a modified form.

It is important to make a tight joint between the rim M of the tire valve and the washer T, else leakage of compressed air will occur between them, the air escaping outside the tire valve. To make such tight joint the present invention relies on a sufficient pressure between the rim and washer, with the minimum of lateral contact, or with no lateral contact, between the washer and the threaded exterior of the valve nipple. This pressure is secured primarily by the upward pressure of the tire valve rim against the shoulder c of the washer, whereby the latter is stretched somewhat upwardly; and secondly, by an inward and downward pressure of the washer upon such rim, due to the admission of air pressure above and around the washer. The essential effect of the fluid pressure is as shown by the short arrows in Fig. 5. The flange I' not being packed, compressed air enters past it into the chamber K and presses against the exterior of the washer, as shown by the larger arrows in Fig. 5. Thus the washer, which is yielding above the stiffener V, is crowded downwardly and inwardly, to force it tightly against the rim of the valve shell. Incidentally the washer is pressed tightly against the neck of the opener at a and against the flange L thereof at the lower part of portion b, whereby the inclosed space is sealed and the air pressure on top of the washer is made more effective to crowd it down upon the rim, the thickened wall of the washer at b contributing to this result. But the engagement of the neck a with the opener is not essential, since the washer may be shortened, as shown in Fig. 7, to similar effect.

By reason of the stiffening of the lower portion of the washer, the lower part thereof is not crowded in against the screw-threaded exterior of the tire valve nipple. Consequently the screw-threads on the latter do not cut into the rubber as the coupling is pulled away from the valve, and do not have any material abrading effect, with the result that the rubber washer thus constructed will many times outwear those of the constructions heretofore used. It will be observed that in my present construction the stiffening member extends up nearly as high as the screw-threaded exterior of the tire valve nipple when the latter is fully inserted, which is clearly shown in Fig. 5. The washer above this stiffener is made of soft yielding rubber, so as to conform closely to the rim M, the portion between the shoulder c and the top of the stiffener being flexible enough to be easily forced inwardly by the pressure.

Figure 5:
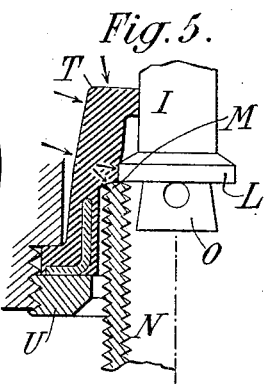
Fig. 5 is a half-section of the washer and its associated parts to show the effect of pressures during inflation.
Figure 4:
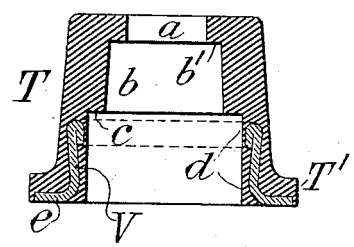
Fig. 4 is an enlarged mid-section of the cupped washer or gasket shown in Fig. 2.

The upper edge of the metallic stiffener V may be curled downwardly, as shown in Fig. 4, or it may terminate in a smooth edge without any seaming-in, as shown in Fig. 5. In fact, the specific construction of the stiffener may be greatly varied, so long as it performs the functions indicated.

The invention is not confined to the precise construction shown and described, nor is its application limited to the precise type or construction of coupling herein first described, as this may be substituted by other known or analogous constructions.

I claim as my invention:—

1. In a coupling for engaging an externally screw-threaded member, a cup-shaped packing adapted to receive such member within it, having an internal shoulder adapted for direct engagement with the rim of such member to make a tight joint therewith, the coupling having a chamber surrounding such packing to which compressed air is admitted to compress the packing, and the packing being substantially uncompressible beneath such shoulder, and yielding at such shoulder, whereby to yieldingly engage the rim portion only of such member.

2. In a coupling adapted to receive an externally screw-threaded member, a cup-shaped packing having an internal shoulder engaging the rim of such member and having its lower portion made substantially rigid for a distance substantially equal to its penetration by the screw-threaded portion of such member, and made yielding above such portion, whereby to afford a tight packing against the rim portion of such member.

3. In a coupling adapted to receive within it an externally screw-threaded member, a cup-shaped packing having an internal shoulder adapted to make direct contact with the rim of such member, such packing being yielding at and near such shoulder, and being substantially rigid at its lower portion for a distance corresponding to the screw-threaded portion of such member, whereby to avoid being contracted against such screw-threaded portion.

4. In a coupling having a check valve, a valve opener and a cup-shaped packing, such valve opener having a shank and flange within such packing, and the packing having a neck portion embracing such shank, an internal shoulder to engage the rim of an inserted valve nipple, and a chambered portion which in operation receives such flange and being at such portion yielding, whereby to be contracted against the opener by the surrounding pressure.

5. In a coupling adapted to receive an externally screw-threaded member, and a valve opener adapted to be lifted by the rim portion of such member when inserted, a cup-shaped packing having a chambered portion to receive and embrace such opener, and a shoulder making direct contact with the rim of such member, and formed of a yielding material, whereby to be contracted into tight contact with both by external pressure.

In witness whereof I have hereunto signed my name.

HENRY P. KRAFT.